United States Patent
Hsu et al.

(10) Patent No.: US 9,292,052 B2
(45) Date of Patent: Mar. 22, 2016

(54) INFORMATION DISPLAY METHOD AND ELECTRONIC DEVICE

(75) Inventors: Wei-Ling Hsu, Taipei (TW); Ming-Che Weng, Taipei (TW); Yu-Jen Huang, Taipei (TW); Hong-Tien Wang, Taipei (TW); Shi-Kuan Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 117 days.

(21) Appl. No.: 13/468,006

(22) Filed: May 9, 2012

(65) Prior Publication Data
US 2013/0009990 A1 Jan. 10, 2013

Related U.S. Application Data

(60) Provisional application No. 61/506,147, filed on Jul. 10, 2011.

(51) Int. Cl.
G06F 1/16 (2006.01)
G06F 3/0488 (2013.01)
G06F 3/0483 (2013.01)
G06F 3/0481 (2013.01)

(52) U.S. Cl.
CPC ............ *G06F 1/1694* (2013.01); *G06F 3/0483* (2013.01); *G06F 3/0488* (2013.01); *G06F 3/04817* (2013.01)

(58) Field of Classification Search
USPC ......................................................... 345/629
See application file for complete search history.

(56) References Cited

U.S. PATENT DOCUMENTS

| 2008/0307364 A1* | 12/2008 | Chaudhri | G06F 3/0483 715/836 |
| 2009/0217198 A1* | 8/2009 | Jung | 715/802 |
| 2011/0252372 A1* | 10/2011 | Chaudhri | 715/835 |

FOREIGN PATENT DOCUMENTS

TW   200930018   7/2009

OTHER PUBLICATIONS

Agarawala, Anand, and Ravin Balakrishnan. "Keepin' it real: pushing the desktop metaphor with physics, piles and the pen." Proceedings of the SIGCHI conference on Human Factors in computing systems. ACM, 2006.*
"Office Action of Taiwan Counterpart Application", issued on Jul. 14, 2014, p. 1-p. 7.

* cited by examiner

*Primary Examiner* — Mark Zimmerman
*Assistant Examiner* — Vu Nguyen
(74) *Attorney, Agent, or Firm* — Jianq Chyun IP Office

(57) ABSTRACT

An information display method for an electronic device is provided, wherein the electronic device includes a display apparatus, a processor and a sensor unit. The display apparatus displays at least a stacked icon composed of a plurality of pieces of information. The information display method includes processing the sensing signal received from the sensor unit by the electronic device. According the sensing signal, a launching signal is provided by the processor. According the launching signal, the stacked icon is spread out by the processor to display each piece of the information.

11 Claims, 5 Drawing Sheets

INFORMATION DISPLAY METHOD AND ELECTRONIC DEVICE

CROSS-REFERENCE TO RELATED APPLICATION

This application claims the priority benefit of U.S. provisional application Ser. No. 61/506,147, filed on Jul. 10, 2011. The entirety of the above-mentioned patent application is hereby incorporated by reference herein and made a part of this specification.

BACKGROUND OF THE INVENTION

1. Field of the Invention

The invention relates to a display method and an electronic device. Particularly, the invention relates to an information display method of an electronic device and the electronic device.

2. Description of Related Art

Along with a rapid development of electronic technology, consumer electronics products are widely used in people's daily life, and electronic devices of different functions are accordingly developed. To facilitate carrying around and usage of the electronic device, advanced functions of the electronic device have been developed, for example, touch signals generated though gesture motions have gradually replaced conventional keyboard signals, which is a trend of a new generation of input interface.

Presently, regarding an electronic device using a touch panel as an input interface, a screen of a display apparatus can display various icons to represent a plurality pieces of information, and a user can inspect the information by directly touching the icons displayed in the screen. However, in the display apparatus of the electronic device, the pieces of information are generally arranged in a line for presentation, so that a space of the interface of the display apparatus is filled with the pieces of information, which is not easy to read. Moreover, if the user wants to inspect the information on the screen, the user has to click the icon displayed on the screen, however, by clicking the icon to display the information, it is liable to mistouch other information content, and the user has to repeatedly click to inspect each piece of the information. In this way, the user cannot conveniently read information or immediately obtain an information content to be inspected.

SUMMARY OF THE INVENTION

The invention is directed to an information display method of an electronic device and the electronic device, which is capable of enlarging a usage space of a display apparatus to facilitate a user to store a plurality pieces of information on the display apparatus, and the user is capable of conveniently inspecting the information stored on the display apparatus.

The invention provides an information display method of an electronic device, where the electronic device includes a display apparatus, a processor and a sensor unit. The display apparatus displays at least one stacked icon, where the stacked icon is composed of a plurality pieces of information stacked to each other. The information display method includes following steps. The electronic device processes a sensing signal received from the sensor unit. The processor generates a launch signal according the sensing signal. The processor spreads out the stacked icon on the display apparatus to display each piece of the information according the launch signal.

In an embodiment of the invention, the pieces of information have a same attribute.

In an embodiment of the invention, the pieces of information are generated by executing an application program, and the pieces of information, based on a same theme, respectively provide a different information content.

In an embodiment of the invention, the pieces of information respectively provide the different information content according to a time section, a regional division or a category.

In an embodiment of the invention, an event includes an acceleration variation of the electronic device or a gesture motion on the display apparatus.

In an embodiment of the invention, when the event is the acceleration variation of the electronic device along a direction or the gesture motion along the direction, a method of spreading out the stacked icon includes sequentially distributing the pieces of information along the direction within a display range of the display apparatus.

In an embodiment of the invention, the pieces of information distributed along the direction present a partial overlapping distribution or an independent distribution.

The invention provides an electronic device including a display apparatus, a sensor unit, a storage medium and a processor. The display apparatus displays at least one stacked icon, where the stacked icon is composed of a plurality pieces of information stacked to each other. The sensor unit senses an event, and generates a launch signal according to the event. The storage medium stores a computer readable/writable program. The processor executes a plurality of instructions of the computer readable/writable program, where the instructions include spreading out the stacked icon to display each piece of the information according to the launch signal.

In an embodiment of the invention, the pieces of information have a same attribute.

In an embodiment of the invention, the pieces of information are generated by the processor by executing an application program, and the pieces of information, based on a same theme, respectively provide different information contents.

In an embodiment of the invention, the pieces of information respectively provide the different information content according to a time section, a regional division or a category.

In an embodiment of the invention, an event includes an acceleration variation of the electronic device or a gesture motion on the display apparatus.

In an embodiment of the invention, when the event is the acceleration variation of the electronic device along a direction or the gesture motion along the direction, a method of spreading out the stacked icon includes sequentially distributing the pieces of information along the direction within a display range of the display apparatus.

In an embodiment of the invention, the pieces of information distributed along the direction present a partial overlapping distribution or an independent distribution.

In an embodiment of the invention, the sensor unit includes a touch sensor, a G-sensor, a gyro sensor or a compass sensor.

The invention provides an information display method of an electronic device, where the electronic device includes a display apparatus, a processor and a sensor unit. The display apparatus displays at least one stacked icon, where the stacked icon is composed of a plurality pieces of information stacked to each other. The information display method includes following steps. The electronic device processes a sensing signal received from the sensor unit. The processor generates a launch signal according the sensing signal. The processor spreads out a plurality pieces of second information at peripheral of a first piece of information on the display apparatus by the processor according the launch signal.

According to the above descriptions, in the information display method of an electronic device and the electronic device, when the electronic device senses an event to generate the launch signal, the stacked icon on the display apparatus can be spread out to display each piece of information in the stacked icon. Therefore, a plurality pieces of information can be stored on the display apparatus, and the information can consist different stacked icon according to same attributes, and the user can generate the launch signal on the electronic device to inspect the information in the stacked icon. In this way, a display space on the display apparatus can be saved to facilitate the user to inspect different information contents.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
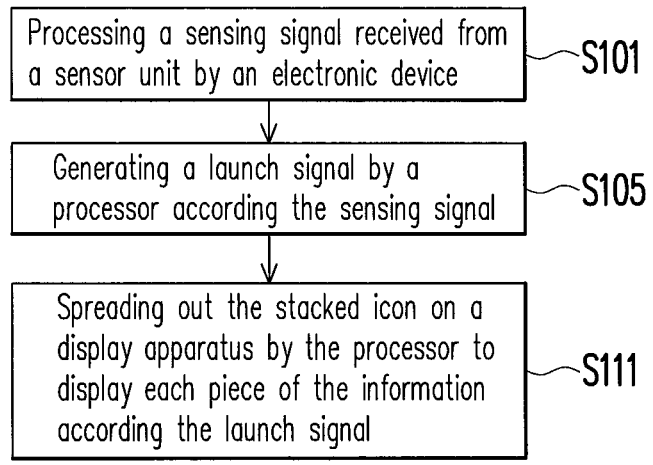
FIG. 1 is a flowchart illustrating an information display method of an electronic device according to an embodiment of the invention.
Figure 2A:
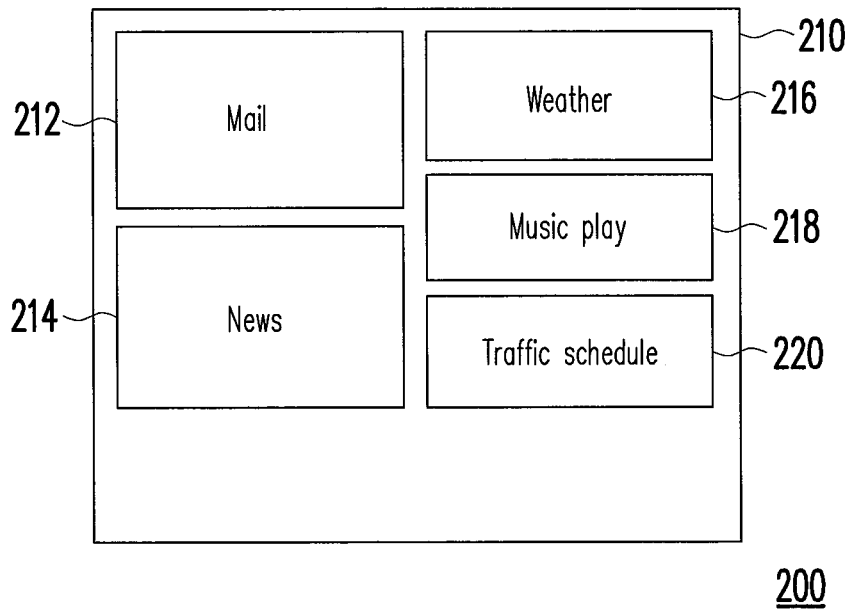
FIG. 2A is an appearance schematic diagram of an electronic device according to an embodiment of the invention.

FIG. 1 is a flowchart illustrating an information display method of an electronic device according to an embodiment of the invention. FIG. 2A is an appearance schematic diagram of an electronic device according to an embodiment of the invention. Referring to FIG. 1 and FIG. 2A, the information display method of the embodiment is adapted to an electronic device, where the electronic device includes a display apparatus. The electronic device is, for example, a notebook computer, a tablet computer, a personal digital assistant (PDA), a mobile phone, a digital camera, an E-book, a game machine or other electronic device having the display apparatus. The display apparatus 210 of the electronic device 200 displays at least one stacked icon (for example, stacked icons 212-220), where each of the stacked icons is composed of a plurality pieces of information stacked to each other. In detail, the pieces of information displayed on the display apparatus 210 can be categorized by different attributes, for example, attributes of mail, news, weather, music and traffic schedule, etc., and the pieces of information having the same attributes are stacked together to form one stacked icon. For example, the stacked icon 212, the stacked icon 214, the stacked icon 216, the stacked icon 218 and the stacked icon 220 respectively include a plurality pieces of mail information, a plurality pieces of news information, a plurality pieces of weather information, a plurality pieces of music information, and a plurality pieces of traffic schedule information. In this way, as the pieces of information having the same attribute can be gathered in a specific stacked icon on the display apparatus, not only the information having the same attributes can be systematically categorized on the display apparatus, a display space of the display apparatus can also be enlarged. In the present embodiment, although the five stacked icons 212-220 are illustrated in FIG. 2A, in the display apparatus 210, the number of the stacked icons displayed on the display apparatus 210 is not limited thereto, and those skilled in the art can design more stacked icons according to an actual design requirement.

Further, each piece of the information in each stacked icon is generated by the electronic device 200 by executing an application program, and the pieces of information, based on a same theme, respectively provide different information contents, and further respectively provides different information contents according to a time section, a regional division, a category or other information dividing methods.

Figure 3A:
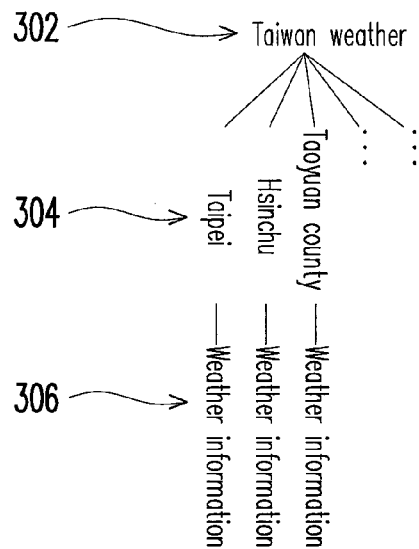
FIG. 3A is a schematic diagram of a tree-like information category according to an embodiment of the invention.

FIG. 3A is a schematic diagram of a tree-like information category according to an embodiment of the invention. For example, regarding the stacked icon 216 composed of a plurality pieces of weather information, the electronic device 200 executes an application program to extract the weather information, and if the weather information is divided by regions, and the weather of different regions of Taiwan is taken as an information theme 302, each pieces of weather information provides weather information (i.e. information content) 306 of each administrative region 304 of Taiwan, for example, weather, temperature, humidity or wind speed of Taipei, New Taipei, and Taoyuan county, etc.

Figure 3B:
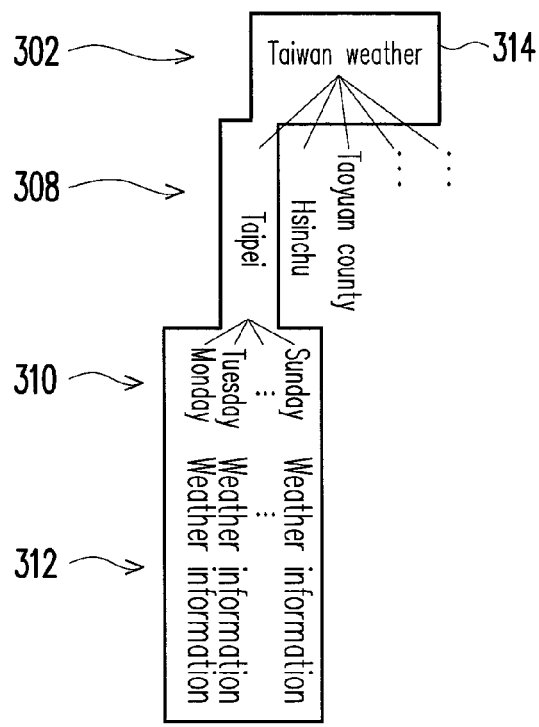
FIG. 3B is a schematic diagram of a tree-like information category according to another embodiment of the invention.

FIG. 3B is a schematic diagram of a tree-like information category according to another embodiment of the invention. In the other embodiment, under the information theme 302 of the Taiwan weather, each administrative region is taken as a sub theme 308, and according to the time sections (for example, taking a day, a week or a month as a unit), the weather information of each region is categorized into weather information 312 of different time sections 310, for example, weather forecasts of the Taipei region in each day of a week (a part of a tree-like diagram 314 framed by thick lines). Therefore, all pieces of the weather information of Taiwan, for example, the weather forecast of each administrative region and the weather forecasts of different time sections of each administrative region can construct the stacked icon 216 (FIG. 2A). Moreover, in the present embodiment, the weather information of Taiwan is taken as the theme 302, each administrative region is taken as the sub theme 308, and the pieces of weather information are categorized according to the time sections. However, the invention is not limited thereto, and the theme, the sub theme and the information category pattern can be changed by those skilled in the art by changing a setting of the executed application program. However, the concept of collecting and categorizing the information based on the same attribute (theme) is not changed.

In the other stacked icons, for example, the stacked icon 220 composed of information of traffic schedule (i.e. traffic information is taken as the theme/attribute), the traffic information can be categorized according to time sections, so as to provide traffic information of different time sections. In the stacked icon 218 composed of music information (i.e. the music information is taken as the theme/attribute), information of different songs can be provided according to categories of music. Moreover, in each stacked icon displayed in the display apparatus 210, the number of pieces of the stacked information is not limited, and an information content of latest information can be displayed on a top layer of the stacked icon, which facilitates the user to inspect the latest information content.

In a step S101, the electronic device 200 senses an event. In detail, according to a method that the electronic device 200 senses the event, an acceleration variation of the electronic device 200 (i.e. a change in acceleration of the electronic device caused by a physical movement thereof) is sensed, or a gesture motion on the display apparatus is sensed. To be specific, the electronic device 200 senses the acceleration variation of the electronic device 200 caused by the user, or senses a gesture motion conducted by the user on the display apparatus 210 to generate a touch signal. For example, the user waves, sways or rotates the electronic device 200 to cause the acceleration variation of the electronic device 200, or the user conducts a gesture motion on the stacked icon of the display apparatus 210, for example, slides, drags, presses or clamps the stacked icon. The acceleration of the electronic device 200 is, for example, an acceleration of gravity or an angular velocity.

In step S105, the electronic device 200 generates a launch signal after sensing the event. Then, in step S111, the electronic device 200 spreads out the stacked icon to display each piece of the information in the stacked icon according to the launch signal. For example, when the event sensed by the electronic device 200 is the acceleration variation along a direction or the gesture motion along the direction, the electronic device 200 spreads out the stacked icon along the direction of the acceleration variation or the direction of the gesture motion, and distributes the information that consists the stacked icon within a display range of the display apparatus 210. The information distributed within the display range of the display apparatus 210 presents a partial overlapping distribution or an independent distribution.

Figure 2B:
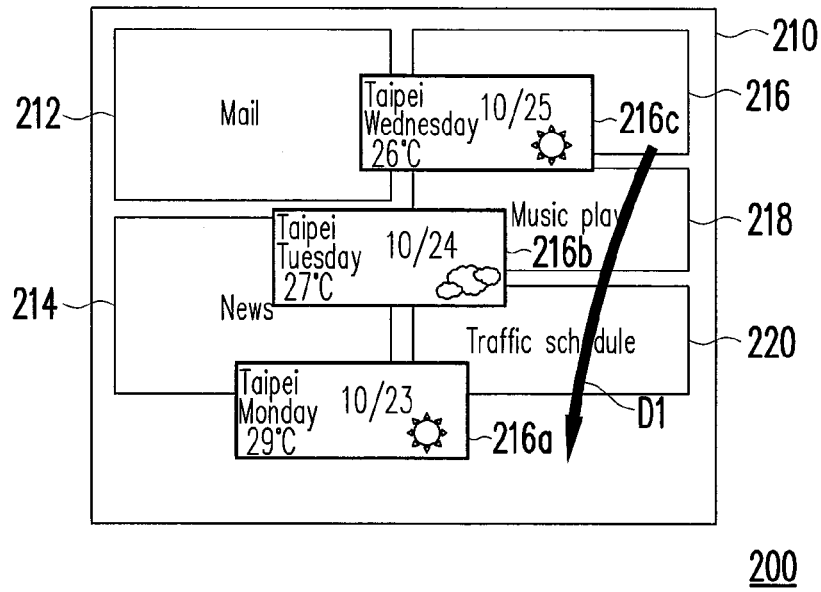
FIG. 2B is a schematic diagram of spreading out a stacked icon to display each piece of information in an information display method of an electronic device according to an embodiment of the invention.

FIG. 2B is a schematic diagram of spreading out a stacked icon to display each piece of information in the information display method of the electronic device according to an embodiment of the invention. In the present embodiment, since the stacked icon 216 of FIG. 2A is composed of the weather information, and in the weather information of the stacked icon 216, the "weather of the Taipei region" is taken as the theme, if the user the conducts a slide gesture motion (referring to an arrow D1 in FIG. 2B) on top of the stacked icon 216 composed of the weather information, the electronic device 200 senses the gesture motion of the user, and accordingly generates a launch signal to spread out the multiple pieces of the weather information in the stacked icon 216, for example, the pieces of information 216a-216c, where the pieces of information 216a-216c respectively present temperatures of the Taipei region from Monday to Wednesday, and present the weather conditions by schematic diagrams. In this way, the user can inspect the information content of each stacked icon by conducting a gesture motion on the stacked icon.

Figure 2C:
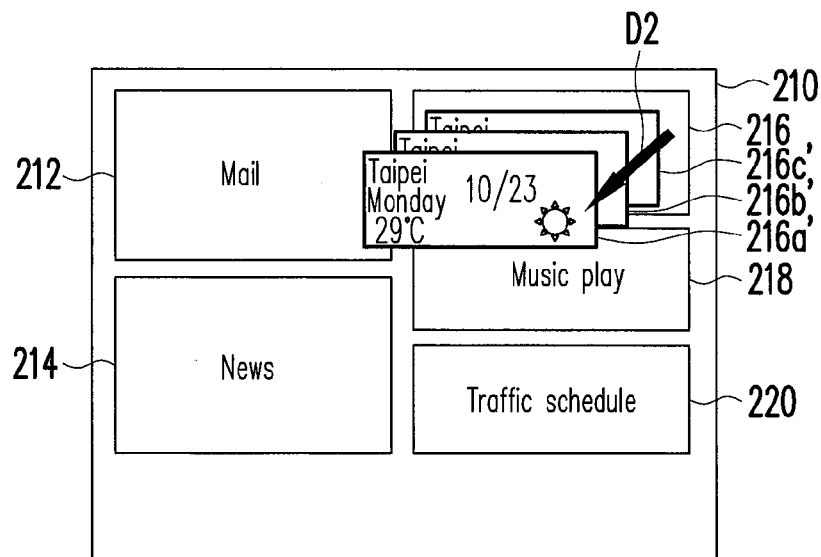
FIG. 2C is a schematic diagram of spreading out a stacked icon to display each piece of information in overlapping in an information display method of an electronic device according to an embodiment of the invention.

On the other hand, the user can also conduct a gesture motion on top of the stacked icon composed of the weather information or produce an acceleration variation, and the information in the stacked icon can present the partial overlapping distribution. FIG. 2C is a schematic diagram of spreading out a stacked icon to display each piece of information in overlapping in the information display method of the electronic device according to an embodiment of the invention. In FIG. 2C, the electronic device 200 senses a gesture motion conducted by the user on top of the stacked icon 216 composed of the weather information, and accordingly generates a launch signal to spread out the multiple pieces of the weather information in the stacked icon 216, and the pieces of weather information present the partial overlapping distribution within the display range of the display apparatus 210. For example, the pieces of information 216'a-216c', where the pieces of information 216a'-216c' respectively present the weather information of the Taipei region. In this way, the user can inspect a part of the information content of each stacked icon by conducting a gesture motion on the electronic device 200 or generating an acceleration variation.

Figure 4A:
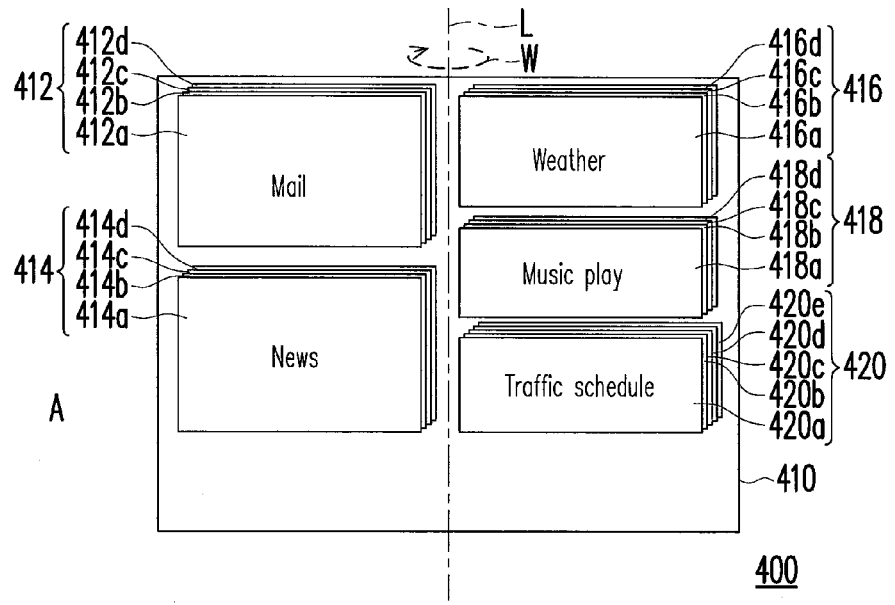
FIG. 4A is a schematic diagram of spreading out a stacked icon to display each piece of information in an information display method of an electronic device according to an embodiment of the invention.

FIG. 4A is a schematic diagram of spreading out a stacked icon to display each piece of information in the information display method of the electronic device according to an embodiment of the invention. Referring to FIG. 4A, in the present embodiment, when the electronic device 400 rotates along a rotation axis L to a first side A of the electronic device to produce the acceleration variation, the electronic device 400 senses such event and accordingly generates the launch signal, so as to spread the stacked icon along the direction of the acceleration variation, and distribute the pieces of information that consist the stacked icon within the display region of the display apparatus. Namely, the stacked icons 412-420 display the pieces of information that consist the stacked icon 412-420 along a rotation direction w of the acceleration variation, for example, display the pieces of information 412a-412d that used to consist the stacked icon 412.

Figure 4B:
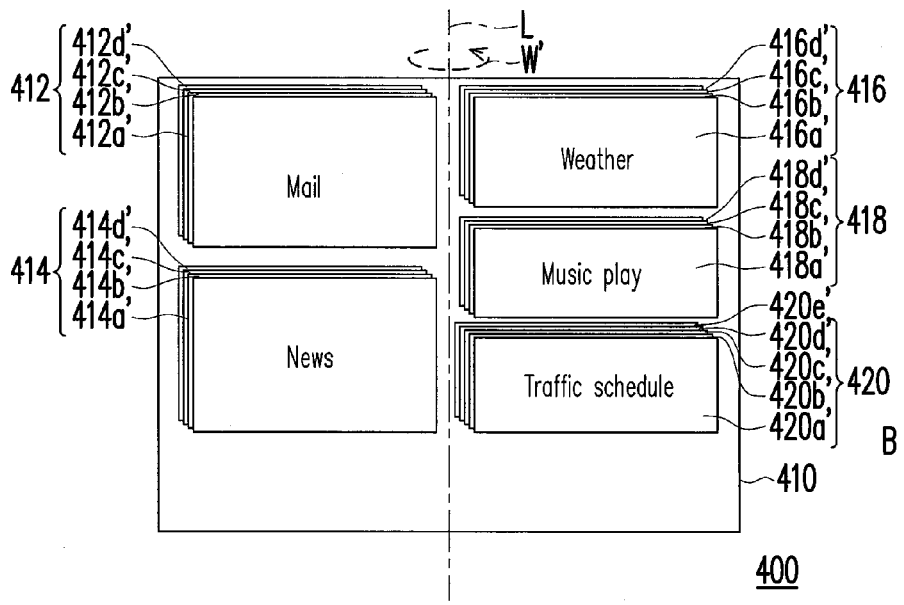
FIG. 4B is a schematic diagram of spreading out a stacked icon to display each piece of information in an information display method of an electronic device according to an embodiment of the invention.

Moreover, when the electronic device 400 rotates along the rotation axis L to a second side B of the electronic device to produce the acceleration variation, the electronic device 400 senses such event and accordingly generates the launch signal, as shown in FIG. 4B, the electronic device 400 spreads the stacked icon along the direction w' of the acceleration variation, so as to display the information (for example, the pieces of information 412a'-412d' used for consisting the stacked icon 412) of each of the stacked icons 412-420 within the display region of the display apparatus. In the present embodiment, the information of the stacked icon is not limited to present the partial overlapping distribution along the direction of the first side A or the second side B, but can present the partial overlapping distribution along other directions.

Figure 5:
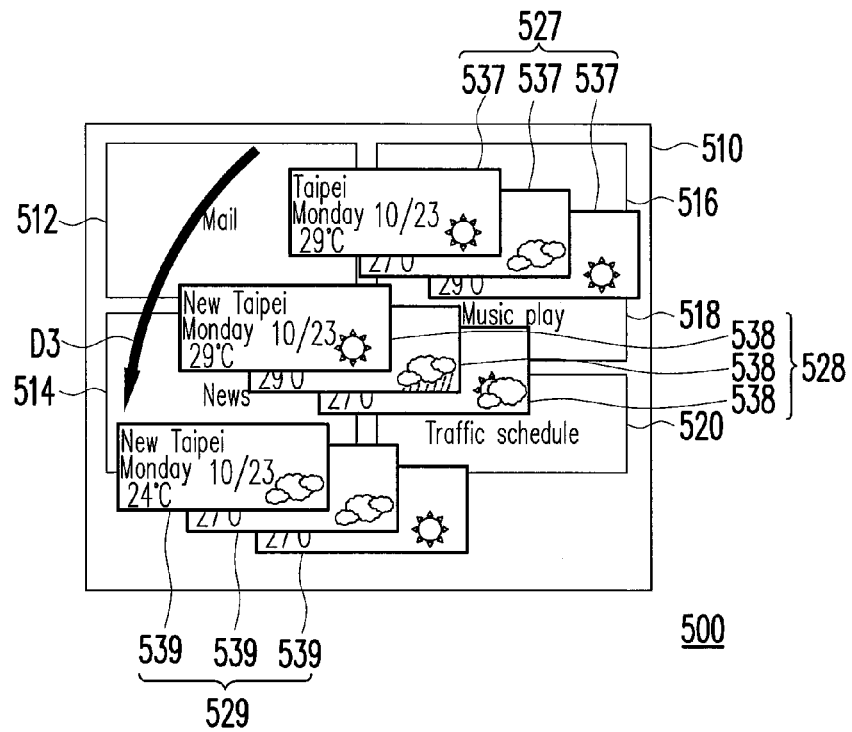
FIG. 5 is a schematic diagram of spreading out a stacked icon to display each piece of information in an information display method of an electronic device according to an embodiment of the invention.

FIG. 5 is a schematic diagram of spreading out a stacked icon to display a plurality pieces of second information at peripheral of first information in the information display method of the electronic device according to an embodiment of the invention. Referring to FIG. 5, in the present embodiment, the user can spread out first pieces of information of the stacked icon within the display range of the display apparatus 510 along the direction of the acceleration variation or the direction of the gesture motion, so as to display a plurality of second pieces of information in each of the stacked icon at peripheral of the first pieces of information, where the second pieces of information can be a sub theme of the first piece of information. In an embodiment, the second pieces of information can be partially overlapped to each other (for example, the partially overlapped pieces of information 537, 538 and 539 shown in FIG. 5), or can be spread out independently. For example, regarding the stacked icon 516 composed of the weather information, under the theme of Taiwan's weather, the stacked icon 516 includes the weather information of each of the administrative regions that serves as the sub theme, for example, weather information 527 of Taipei, weather information 528 of New Taipei, and weather information 529 of Hsinchu city. In the information that takes the each of the administrative region as the sub theme, according to the time sections (for example, taking a day, a week or a month as a unit), the pieces of weather information of each region are categorized into weather information of different time sections. For example, when the user conducts a slide gesture motion (referring to an arrow D3 of FIG. 5) on top of the stacked icon 516 composed of the weather information, the electronic device 500 senses the gesture motion of the user, and accordingly generates the launch signal to spread out the pieces of weather information in the stacked icon 516, and display the pieces of weather information of different time sections at peripheral of the weather information of each of the administrative region. For example, the weather information 527 of Taipei, the weather information 528 of New Taipei, and the weather information 529 of Hsinchu city respectively display the weather forecast information 537, 538 and 539 of each day in a week, and present the weather conditions by schematic diagrams. In this way, the user can inspect the information content of each stacked icon and the information content of the sub theme at peripheral of each information content by conducting a gesture motion on the stacked icon or generating an acceleration variation.

Figure 6:
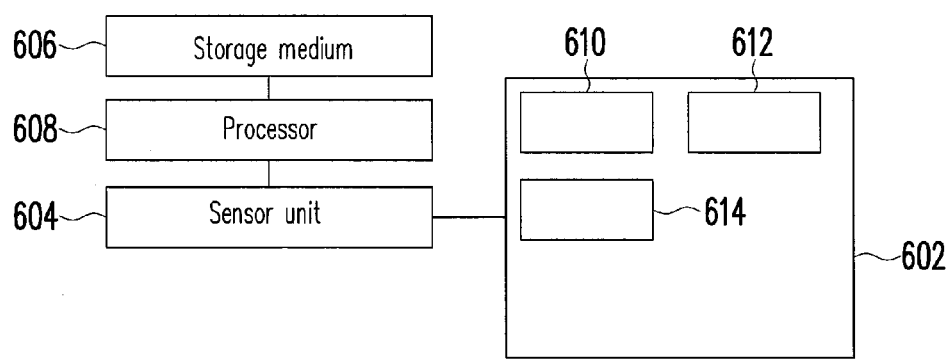
FIG. 6 is a schematic diagram of an electronic device according to an embodiment of the invention.

FIG. 6 is a schematic diagram of an electronic device according to an embodiment of the invention. Referring to FIG. 6, the electronic device 600 of the present embodiment includes a display apparatus 602, a sensor unit 604, a storage medium 606 and a processor 608. In detail, the display apparatus 602 displays at least one stacked icon composed of a plurality pieces of information stacked to each other, for example, stacked icons 610, 612 and 614, where the information in each of the stacked icons has the same attribute, and is generated by the processor 608 by executing an application program. Moreover, the information may have a same theme, and the information respectively provides different information contents according to a time section, a regional division, a category, or other information dividing methods. The sensor unit 604 includes a touch sensor, a G-sensor, a gyro sensor or a compass sensor, which is used to sense an event. The event sensed by the sensor unit 604 is, for example, an acceleration variation of the electronic device 600 or a gesture motion on the display apparatus 602. The sensor unit 605 generates a launch signal according to the event. The storage medium 606 stores a computer readable/writable program. The information display method of the electronic device can be implemented by the processor 608 by executing a plurality of instructions of a computer readable/writable program stored in the storage medium 606, wherein the instructions includes spreading out the stacked icon to display each piece of the information according to the launch signal generated by the sensor unit 604. The information display method of the electronic device has been described in detail in the aforementioned embodiments (referring to related descriptions of FIG. 1, FIGS. 2A-2C, FIGS. 3A-3B, FIGS. 4A-4B and FIG. 5), which are not repeated.

In summary, in the information display method of an electronic device and the electronic device, the information having the same attribute is displayed on the display apparatus in a stacked icon, and each piece of information provides a different information content according to a theme through an application program. When the electronic device senses an event to generate the launch signal, the electronic device spreads out the stacked icon on the display apparatus to display each piece of information in the stacked icon. In this way, the pieces of information having the same attribute displayed on the display apparatus can be gathered to save a display space of the display apparatus, and the user can conveniently inspect different information content by conducting a gesture motion or by generating an acceleration variation on the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An information display method of an electronic device, wherein the electronic device comprises a display apparatus, a processor and a sensor circuit, the information display method comprising:
    displaying a plurality of stacked icons on the display apparatus by the processor, wherein each of the stacked icons is composed of a plurality pieces of dynamic information partially overlapped and stacked one upon another, the pieces of dynamic information of each of the stacked icons are generated by a same application program;
    processing a sensing signal of an event corresponding to a selected stacked icon among the stacked icons received from the sensor circuit by the electronic device, wherein the sensing signal of the event is an acceleration variation of the electronic device, wherein the acceleration variation is produced when the electronic device rotates along a rotation axis thereof;
    generating a launch signal by the processor according the sensing signal; and
    spreading out and displaying each of the pieces of dynamic information of the selected stacked icon on the display apparatus by the processor according the launch signal, wherein each of the pieces of dynamic information of the selected stacked icon is spread out along a direction of the acceleration variation of the electronic device.

2. The information display method of the electronic device as claimed in claim 1, wherein the pieces of dynamic information of each of the stacked icons have a same attribute.

3. The information display method of the electronic device as claimed in claim 1, wherein the pieces of dynamic information of the selected stacked icon are generated by executing a selected application program, and the pieces of dynamic information of the selected stacked icon, based on a same theme, respectively provide a different information content.

4. The information display method of the electronic device as claimed in claim 3, wherein the pieces of dynamic information of the selected icon respectively provides the different information content according to a time section, a regional division or a category.

5. The information display method of the electronic device as claimed in claim 1,
    wherein each of the pieces of dynamic information of the selected stacked icon is spread out in at least one partial overlapping stack, wherein each of the at least one partial overlapping stack corresponds to a main theme of the selected stacked icon, and wherein a top-most piece of dynamic information of each of the at least one partial overlapping stack corresponds to a sub theme of the selected stacked icon, and wherein each other pieces of dynamic information of each of the at least one partial overlapping stack corresponds to a category of the sub theme of the selected stacked icon.

6. An electronic device, comprising:
a display apparatus, displaying a plurality of stacked icons, wherein the stacked icons are composed of a plurality pieces of dynamic information partially overlapped and stacked one upon another, the pieces of dynamic information of each of the stacked icons are generated by a same application program;
a sensor circuit, sensing an event corresponding to a selected stacked icon among the stacked icons, and generating a launch signal according to the event, wherein the event comprises an acceleration variation of the electronic device, wherein the acceleration variation is produced when the electronic device rotates along a rotation axis thereof;
a storage medium circuit, storing a computer readable and writable program;
a processor, executing a plurality of instructions of the computer readable/writable program, wherein the instructions comprise spreading out and displaying each of the pieces of dynamic information of the selected stacked icons according to the launch signal, wherein each of the pieces of dynamic information of the selected stacked icon is spread out along a direction of the acceleration variation of the electronic device.

7. The electronic device as claimed in claim 6, wherein the pieces of dynamic info illation of each of the stacked icons have a same attribute.

8. The electronic device as claimed in claim 6, wherein the pieces of dynamic information of the selected stacked icon are generated by the processor by executing a selected application program, and the pieces of dynamic information of the selected stacked icon are based on a same theme, and respectively provide a different information content.

9. The electronic device as claimed in claim 8, wherein the pieces of dynamic information of the selected icon respectively provide the different information content according to a time section, a regional division or a category.

10. The electronic device as claimed in claim 6, wherein the sensor circuit comprises a touch sensor, a G-sensor, a gyro sensor or a compass sensor.

11. The information display method of the electronic device as claimed in claim 1, wherein each of the pieces of dynamic information of the selected stacked icon is spread out in a tree-like representation, wherein a root of the tree-like representation corresponds to a main theme of the selected stacked icon, and wherein child nodes of root correspond to at least one sub theme of the selected stacked icon.

* * * * *

UNITED STATES PATENT AND TRADEMARK OFFICE
CERTIFICATE OF CORRECTION

| | | |
|---|---|---|
| PATENT NO. | : 9,292,052 B2 | Page 1 of 1 |
| APPLICATION NO. | : 13/468006 | |
| DATED | : March 22, 2016 | |
| INVENTOR(S) | : Wei-Ling Hsu et al. | |

It is certified that error appears in the above-identified patent and that said Letters Patent is hereby corrected as shown below:

On the Title Page and in the Specification, Column 1, replace Title with:

--DYNAMIC INFORMATION DISPLAY METHOD OF APPLICATION PROGRAM AND ELECTRONIC DEVICE THEREOF--

Signed and Sealed this
Seventh Day of June, 2016

Michelle K. Lee
*Director of the United States Patent and Trademark Office*